(12) United States Patent
Komai

(10) Patent No.: US 6,973,366 B2
(45) Date of Patent: Dec. 6, 2005

(54) PRODUCTION PROCESS CONTROL SYSTEM

(75) Inventor: Hirokazu Komai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 168 days.

(21) Appl. No.: 10/704,902

(22) Filed: Nov. 12, 2003

(65) Prior Publication Data
US 2004/0098152 A1 May 20, 2004

(30) Foreign Application Priority Data
Nov. 15, 2002 (JP) .............................. 2002-331546

(51) Int. Cl.⁷ ............................................ G06F 19/00
(52) U.S. Cl. .................................................. 700/126
(58) Field of Search ................................ 700/125–129

(56) References Cited

U.S. PATENT DOCUMENTS

2003/0117747 A1 * 6/2003 Kunikata et al. ............ 360/134
2004/0079832 A1 * 4/2004 Komai ..................... 242/523.1
2004/0214046 A1 * 10/2004 Ejiri et al. ............. 428/694 SG
2005/0116081 A1 * 6/2005 Kato et al. .................. 242/547

FOREIGN PATENT DOCUMENTS

JP 7-37362 A 2/1995

* cited by examiner

Primary Examiner—Leo Picard
Assistant Examiner—Chad Rapp
(74) Attorney, Agent, or Firm—Sughrue Mion, PLLC

(57) ABSTRACT

A production process control system, which includes a production process control server controlling production process information of a product and a control terminal controlling production operation of a production facility connected with the production process control server via a network, is equipped with a production process information data base being a data base of the production process information of the product; an information recording means in interruption receiving the production process information data base in interrupting production operation on the way of a production process of the product, and storing the production process information data base; and a search means searching production process information stored by the information recording means in interruption from the production process information data base in restarting interrupted production operation.

18 Claims, 7 Drawing Sheets

SERVO WRITE PROCESS

WINDING PROCESS

REEL PLACING PROCESS

IMPRESS PROCESS

PART BUILDING-IN PROCESS

CARTRIDGE MEMORY(CM) WRITE PROCESS

FIG.4

TABLE OF PRODUCTION PROCESS INFORMATION DATA BASE (IN INTERRUPTION OF PRODUCTION OPERATION)

| PRODUCT NO. | PRODUCTION DATE | PRODUCTION TIME | WINDER ORDINAL NO. | PANCAKE NO. | REMAINING LENGTH | IMPRESS ID | LOT IMPRESS | CMID | INSPECTION RESULT |
|---|---|---|---|---|---|---|---|---|---|
| 12001 | 2002/9/13 | 11:45:06 | 001 | 960412-1 10 | 743.0 | 017M000962 | 227111YO | 013177BC | 0 |
| 12001 | 2002/9/13 | 11:46:30 | 001 | 960412-1 10 | 424.0 | 017M000942 | 227111YO | 01332401 | 0 |
| 12001 | 2002/9/13 | 11:47:54 | 001 | 960412-1 10 | 105.0 | 017M000960 | 227111YO | 013328AD | 0 |
| 12001 | 2002/9/13 | 11:49:17 | 002 | 960412-1 11 | 6546.0 | 017M000940 | 227111YO | 01332A72 | 0 |
| 12001 | 2002/9/13 | 11:50:41 | 002 | 960412-1 11 | 6227.0 | 017M000958 | 227111YO | 01317915 | 9 |
| 12001 | 2002/9/13 | 12:11:40 | 002 | 960412-1 11 | 5479.0 | 017M000938 | 227111YO | | |
| 12001 | 2002/9/13 | 12:13:04 | 002 | 960412-1 11 | 5160.0 | 017M000954 | 227111YO | | |
| 12001 | 2002/9/13 | 12:14:28 | 002 | 960412-1 11 | 4841.0 | 017M000934 | 227111YO | | |
| 12001 | 2002/9/13 | 13:38:11 | 002 | 960412-1 11 | 4159.0 | 017M000956 | 227111YO | | |
| 12001 | 2002/9/13 | 13:39:34 | 002 | 960412-1 11 | 3840.0 | 017M000936 | 227111YO | | |

FIG.5

TABLE OF PRODUCTION PROCESS INFORMATION DATA BASE (IN COMPLETION OF PRODUCTION OPERATION)

| PRODUCT NO. | PRODUCTION DATE | PRODUCTION TIME | WINDER ORDINAL NO. | PANCAKE NO. | REMAINING LENGTH | IMPRESS ID | LOT IMPRESS | CMID | INSPECTION RESULT |
|---|---|---|---|---|---|---|---|---|---|
| 12001 | 2002/9/13 | 11:45:06 | 001 | 960412-1 10 | 743.0 | 017M000962 | 227111YO | 013177BC | 0 |
| 12001 | 2002/9/13 | 11:46:30 | 001 | 960412-1 10 | 424.0 | 017M000942 | 227111YO | 01332401 | 0 |
| 12001 | 2002/9/13 | 11:47:54 | 001 | 960412-1 10 | 105.0 | 017M000960 | 227111YO | 013328AD | 0 |
| 12001 | 2002/9/13 | 11:49:17 | 002 | 960412-1 11 | 6546.0 | 017M000940 | 227111YO | 01332A72 | 0 |
| 12001 | 2002/9/13 | 11:50:41 | 002 | 960412-1 11 | 6227.0 | 017M000958 | 227111YO | 01317915 | 0 |
| 12001 | 2002/9/13 | 12:11:40 | 002 | 960412-1 11 | 5479.0 | 017M000938 | 227111YO | 01317963 | 0 |
| 12001 | 2002/9/13 | 12:13:04 | 002 | 960412-1 11 | 5160.0 | 017M000954 | 227111YO | 01332938 | 0 |
| 12001 | 2002/9/13 | 12:14:28 | 002 | 960412-1 11 | 4841.0 | 017M000934 | 227111YO | 01332AB9 | 0 |
| 12001 | 2002/9/13 | 13:38:11 | 002 | 960412-1 11 | 4159.0 | 017M000956 | 227111YO | 01332896 | 0 |
| 12001 | 2002/9/13 | 13:39:34 | 002 | 960412-1 11 | 3840.0 | 017M000936 | 227111YO | 013179E5 | 0 |

PRODUCTION PROCESS CONTROL SYSTEM

FIELD OF THE INVENTION

The present invention relates to a production process control system, and in particular, relates in a production line to the production process control system which can interrupt product production on a way.

BACKGROUND OF THE INVENTION

Generally, a production process of a product such as a magnetic tape cartridge is controlled by a production process control server. In the control server, a production plan is input, and based on it, a production instruction is issued to a control terminal wherein each production facility is controlled. The control terminal controlling the production facility is connected with the production process control server via a fixed line or wireless network and runs production operation referring to a table of a production process information data base which the control server has.

The control server stores not only the production plan but also information concerning practically performed production, for example, information showing by which servo writer a servo signal is recorded on a certain magnetic tape, in the table of the production process information data base. And it saves the table of the production process information data base in which attribute values (values corresponding to process items and information) are recorded when all production processes of a product finish (for example, see pages 4 and 5 and FIGS. 1 and 4 in Japan patent laid open publication 7-37362).

However, because a conventional technology saves and controls production process information at an end of all production processes, for example, even in the case that a defect is turned out on the way of certain lot of a work for which production is started, the production cannot be interrupted on the way, whereby production operation has to be performed till a last production process.

Therefore, as a result, because the product is flowed till the last production process, there exists a problem that a time loss occurs, and in the case of interruption due to an occurrence of a defect, a waste of raw materials also occurs.

In addition, also in the case of change of the production plan and the like, a lot in production cannot immediately be interrupted, so there exists another problem that the lot has to be produced till its last.

SUMMARY OF THE INVENTION

Considering the above mentioned problems, an exemplary object of the present invention is to provide a production process control system which can flexibly handle a change of a product production plan and an occurrence of a defect.

The invention is a production process control system including a production process control server controlling product production control information and a control terminal which is connected with the production process control server via a network and controls the production operation of a production facility, and is characterized in that: the production process control server is equipped with a production process information data base which is a data base of production process information of a product, an information recording means in interruption which stores the production process information in interruption receiving it from the control terminal in the case of interrupting production operation on the way of production process of the product, and a search means searching the production process information stored by the information recording means in interruption from the production process information data base in restarting interrupted production operation; and the control terminal is equipped with a production process restarting means controlling the production facility so that when restarting the interrupted production operation in the case that a production process taken charge by the control terminal is not finished, the facility performs the production operation based on the production process information in interruption searched by the search means.

According to such the production process control system, in the case that production is restarted after the production operation is interrupted on the way of the production process, the production process control server receives the product production process information in interruption and searches the production process information to restart the production. Then, the control terminal judges whether or not the production process taken charge by the terminal is finished, and if not finished, the terminal can restart the production operation.

BRIEF DESCRIPTION OF THE DRAWINGS

FIG. 4 is a drawing showing a table of a production process information data base in interruption of production operation.

FIG. 5 is a drawing showing a table of a production process information data base in completion of production operation.

DESCRIPTION OF THE PREFERRED EMBODIMENTS

Hereinafter, one of embodiments of the present invention will be described in detail, referring to drawings. In description of the embodiment, a magnetic tape cartridge is cited as a product. Firstly, an outline of production process of the magnetic tape cartridge is described, and a configuration and operation of a production process control system are described.

[Outline of Production Process of Magnetic Tape Cartridge]

Figure 1A:
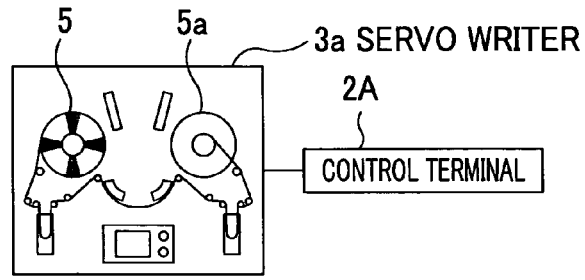
FIGS. 1A, 1B, 1C, and 1D are drawings illustrating a servo write process, winding process, and reel placing process, and impress process, respectively.
Figure 1B:
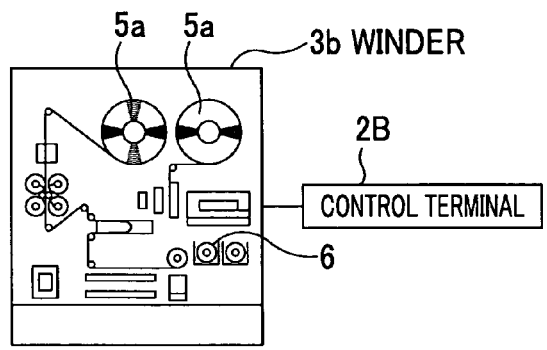
Figure 1C:
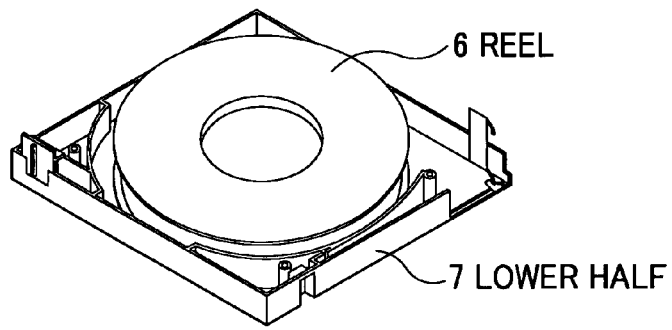
Figure 1D:
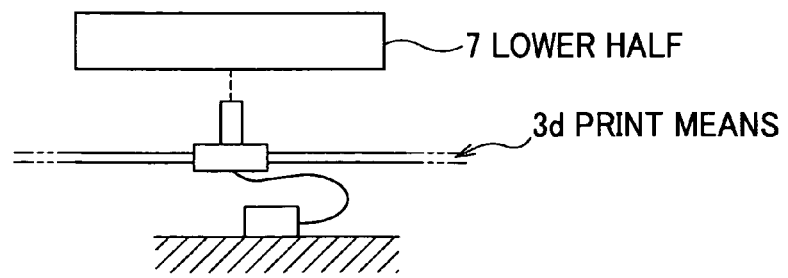
Figure 2A:
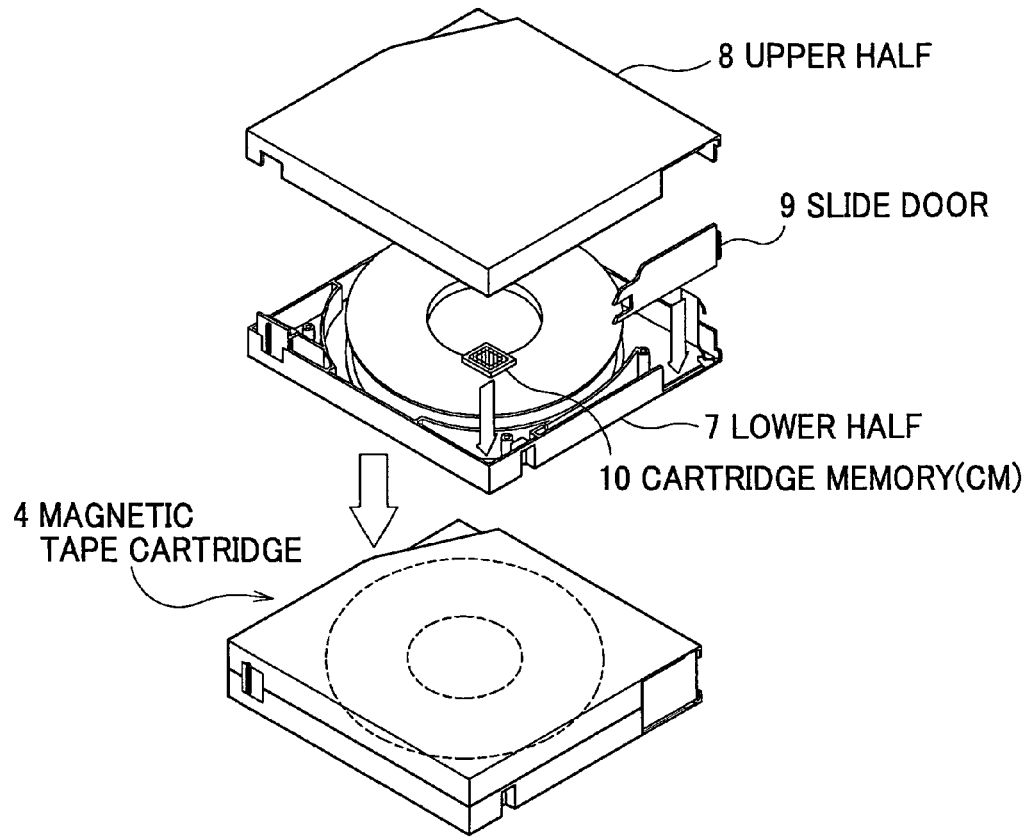
FIGS. 2A and 2B are drawings illustrating a part building-in process and cartridge memory write process, respectively.
Figure 2B:
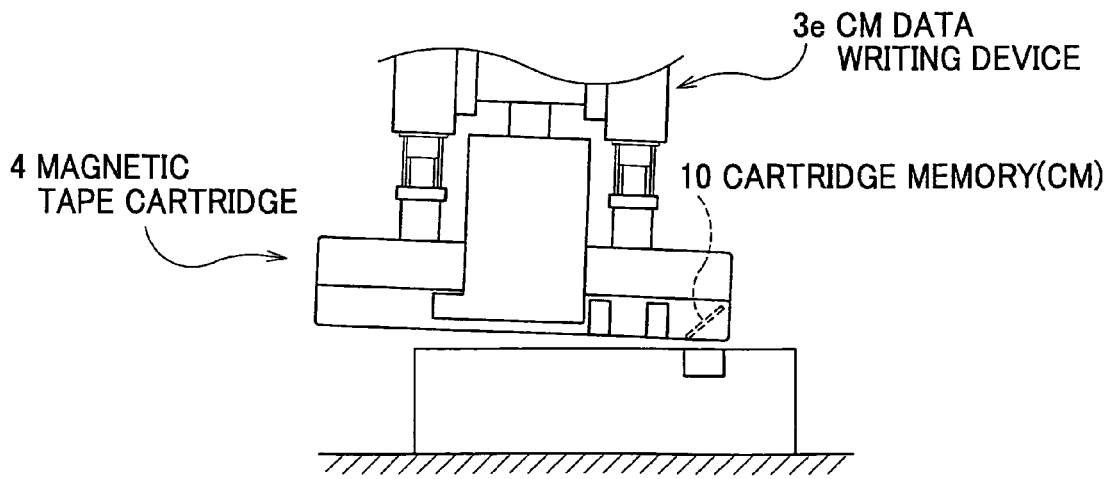

FIGS. 1A, 1B, 1C, and 1D are drawings illustrating a servo write process, winding process, reel placing process, and impress process, respectively; and FIGS. 2A and 2B are drawings illustrating a part building-in process and cartridge memory write process, respectively.

As shown in FIGS. 1A–1D and FIGS. 2 and 3, production processes of a magnetic cartridge 4 in description of one of the embodiments consist of a servo write process, winding process, reel placing process, impress process, part building-in process, cartridge memory write process, and inspection process not shown in the drawings.

Figure 3:
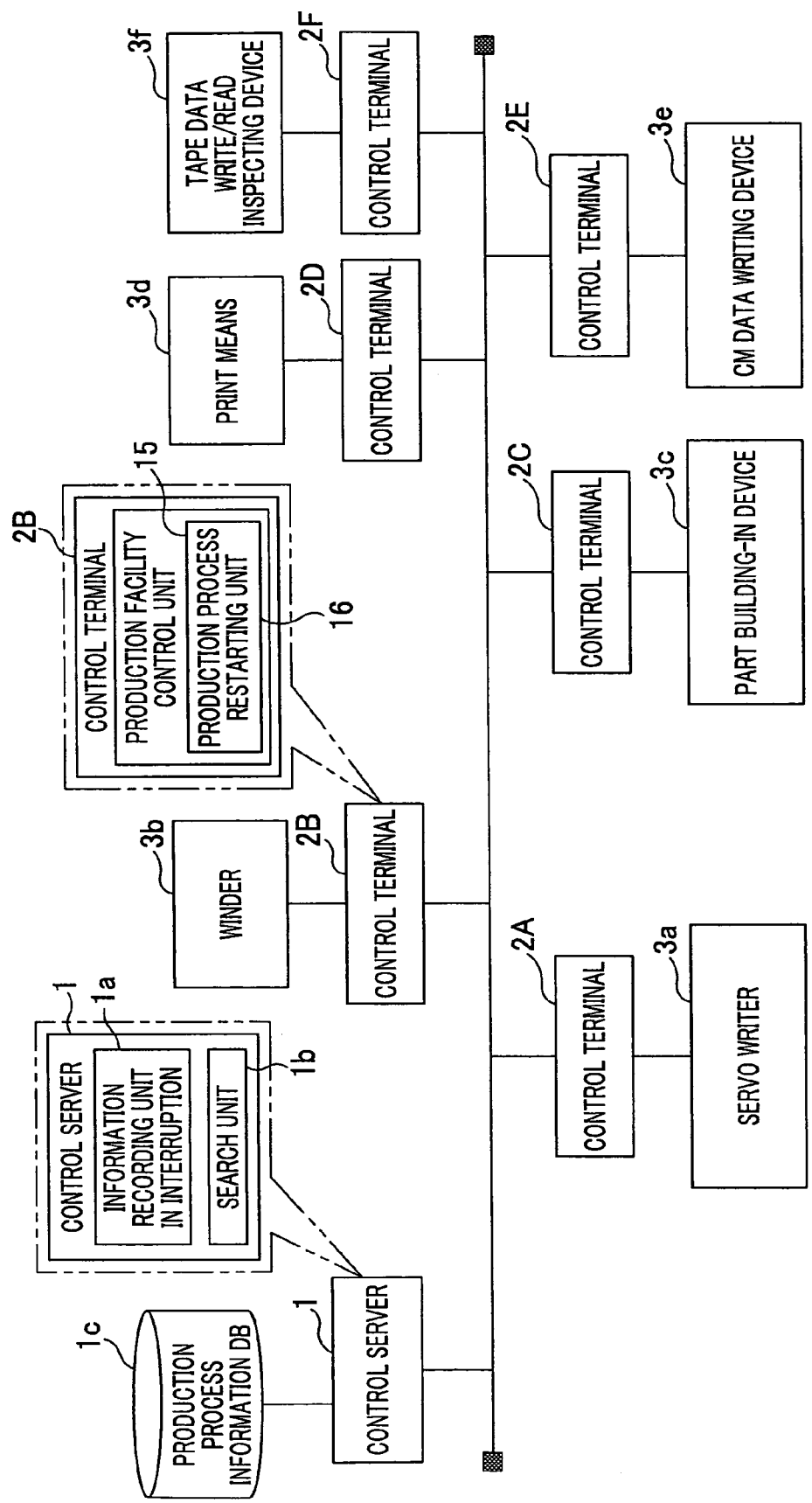
FIG. 3 is a system configuration drawing of production process control of a magnetic tape cartridge related to the invention.

Each facility (servo writer 3a, winder 3b, part building-in device 3c, print means 3d, CM data writing device 3e, and tape data write/read inspecting device 3f) in each production process thus described is controlled by control terminals 2A to 2F (see FIG. 3).

The servo write process is, as shown in FIG. 1A, a production process writing servo signals in a magnetic tape of a pancake (raw tape) 5 by the servo writer (servo signal writing device) 3a.

The winding process is, as shown in FIG. 1B, a production process winding a magnetic tape from pancakes 5a in which the servo signals are written in the servo write process in a product reel 6 set within the winder (winding device) 3b. Meanwhile, a plurality of servo writers 3a and winders 3b are usually prepared to match a processing speed of a production line.

The reel placing process is, as shown in FIG. 1C, a production process placing a reel 6 produced in the winding process on a lower half 7 of a cartridge case.

The impress process is, as shown in FIG. 1D, a process impressing an ID and lot number, which identify individual products, on a bottom portion of the lower half 7 in which the reel 6 is placed in the reel placing process, by the print means 3d. Meanwhile, the impressed ID is a number identifying each work and becomes a search key when production process information in interruption recorded in a production process information data base 1c is searched by an information recording unit 1a in interruption described later.

In addition, when the impress process is finished, individual works become to be able to be identified, whereby production of a magnetic tape cartridge 4 can be interrupted and a work can be stocked. That is, a work which has finished until after the impress process is made to finish processes till completion: a work which has entered processes from the winding process to the impress process is discharged from the production line and stocked when it is made to finish processes till the impress process; a work before entering the winding process is kept as it is as the pancake 5.

The part building-in process is, as shown in FIG. 2A, a production process in which components of the magnetic tape cartridge 4 such as a cartridge memory (hereinafter abbreviated as "CM" as needed) 10 which is a semiconductor memory device, a slide door 9 closing/opening a magnetic tape pulling-out port, and a compression coil spring not shown in the drawing are built in and closed with an upper half 8.

The CM write process is a process to write production process information of the magnetic tape cartridge 4 in the cartridge memory 10 by electric waves with non-contact. The production process information is information showing a history such as time when the cartridge 4 is produced and a used pancake 5.

The inspection process is a process to inspect whether or not there exists a defect in a magnetic tape by testing write/read of data for the magnetic tape.

[Configuration of Production Process Control System of Magnetic Tape Cartridge]

Next, referring to FIG. 3, a configuration of production process control system of a magnetic tape cartridge is described. FIG. 3 is a system configuration drawing of production process control of a magnetic tape cartridge related to the invention.

The production process control system of the magnetic tape cartridge 4 is equipped with a production process control server 1 (hereinafter simply called "control server 1") and control terminals 2a to 2f controlling production operation of each facility 3a to 3f connected with the control server 1 via a LAN (Local Area Network).

Meanwhile, in the embodiment, an "information recording unit 1a in interruption" corresponds to an "information recording means in interruption" in claims of the invention, a "search unit 1b" corresponds to a "search means" in claims of the invention, and a "production process restarting unit 16" corresponds to a "production process restarting means" in claims of the invention.

[Configuration of Control Server]

As shown in FIG. 3, the control server 1 is equipped with the information recording unit 1a in interruption, search unit 1b, and production process information data base 1c.

The information recording unit 1a in interruption records production process information in interruption (see FIG. 4) in the production process information data base 1c when an interruption cause of production operation such a case that a defect is found on the way of lot production and a production plan is changed occurs.

The search unit 1b searches the production process information in interruption recorded in the production process information data base 1c by the information recording unit 1a in interruption out of the information data base 1c.

The control terminals 2A to 2F read the production process information in interruption searched by the search unit 1b or are instructed from the control server 1, and the terminals 2A to 2F control each facility 3a to 3f according to a production process, thereby each the facility 3a to 3f being able to be again operated from an interrupted position on the way of production process of the magnetic tape cartridge 4.

The production process information data base 1c is a data base of production process information of the magnetic tape cartridge 4, and for example, as items of a production process as shown in FIG. 4, sets "Product No.", "Production Date", "Production Time", "Winder Ordinal No.", "Pancake No.", "Remaining Length", "Impress ID (No.)", "Lot Impress", "CMID," and "Inspection Result," and stores attribute values (values and/or information corresponding to each production process item).

In the production process information data base 1c, one row shows one record in which each production process information (items) of the magnetic tape cartridge 4 is input.

Meanwhile, each item means as follows.

The "Product No." is a number identifying a kind of product, and for example, in FIG. 4, a same kind of products is produced, so a same number 12001 is input.

The "Production Date" and "Production Time" show a day and time when a production process, winding process, and the like are completed. For example, in FIG. 4, the "Production Date" and "Production Time" of magnetic tape cartridge 4 of a first record from top means that the winding process was completed 11 o'clock 45 minutes six seconds on the 13th of Sep., 2002.

The "Winder Ordinal No." shows a number of a winder 3b which wound a magnetic tape. For example, in FIG. 4, magnetic tape cartridges 4 till a third record from top show that they were wound by the winder 3b allotted with a number "001."

The "Pancake No." shows a number of a pancake 5a used for winding a magnetic tape. For example, in FIG. 4, the magnetic tape cartridges 4 till the third record from top have used the pancake 5a with a number 960412-110 and those from the fourth record were wound by another winder 3b, so the pancake No. is changed to 960412-1 11.

The "Remaining Length" means a remaining length of the pancake 5a. In FIG. 4, in the magnetic tape cartridges 4 till the third record from top, the remaining length becomes short from 743.0 to 105.0 meters, and there, the pancake 5a was changed, so in the magnetic tape cartridge 4 of the fourth record from top the remaining length becomes 6546.0 meters.

The "Impress ID" is an ID practically printed on a cartridge case (lower half 7) in the impress process and a number identifying a product. For example, in FIG. 4, the magnetic tape cartridge 4 of the first record from top shows that a number 017M000962 was printed.

The "Lot Impress" is a lot number practically printed on a cartridge case (lower half 7) in the impress process. For example, in FIG. 4, all same lot number 227111Y0 is input.

The "CMID" is a something in which a serial number of a cartridge memory 10 read from the memory 10 in a magnetic tape cartridge 4 is recorded. For example, in FIG. 4, the magnetic tape cartridge 4 of the first record from top shows that a number 013177BC was written. In the memory 10, production process information of a relevant magnetic tape cartridge 4 is memorized.

The "Inspection Result" is a something in which a presence or absence of a defect in the magnetic tape cartridge 4 is input in the inspection process. For example, in FIG. 4, assuming that "9" is input in a column of item of the inspection result in the case of presence of the defect and "0" is input in the case of absence of the defect, the magnetic tape cartridge 4 of the first record from top shows that the defect is absent because "0" is input and the magnetic tape cartridge 4 of the fifth record from top shows that the defect is present because "9" is input

[Configuration of Control Terminal]

Next, the control terminals 2A to 2F are described referring to FIG. 3.

The terminals 2A to 2F are respectively equipped with a production facility control unit 15 and a production process restarting unit 16 as a part of the control unit 15.

The production facility control unit 15 controls the production operation of each facility, for example, such as the servo writer 3a, winder 3b, part building-in device 3c, print means 3d, CM data writing device 3e, and tape data write/read inspecting device 3f connected via a RS232C communications interface cable, according to the table of production process information data base 1c of the control server 1. For example, when a facility is the servo writer 3a, there exist a method that the control terminal A receives a command instructing the servo writer 3a to write a servo signal in the pancake 5 from the control server 1, thereby controlling the servo writer 3a; and another method that the control terminal A reads (download) the table of production process information data base 1c of the control server 1, thereby controlling the servo writer 3a according to the table.

The production process restarting unit 16, when restarting interrupted production operation, receives production process information searched for each work by the search unit 1b of the control server 1, judges whether a process in question is completed for each the work based on the production process information, and if not completed, makes each facility 3a to 3e restart the production operation.

[Operation of Production Process Control System of Magnetic Tape Cartridge]

a. [Operation of "Interruption Handling due to Defect Occurrence"]

Figure 6:
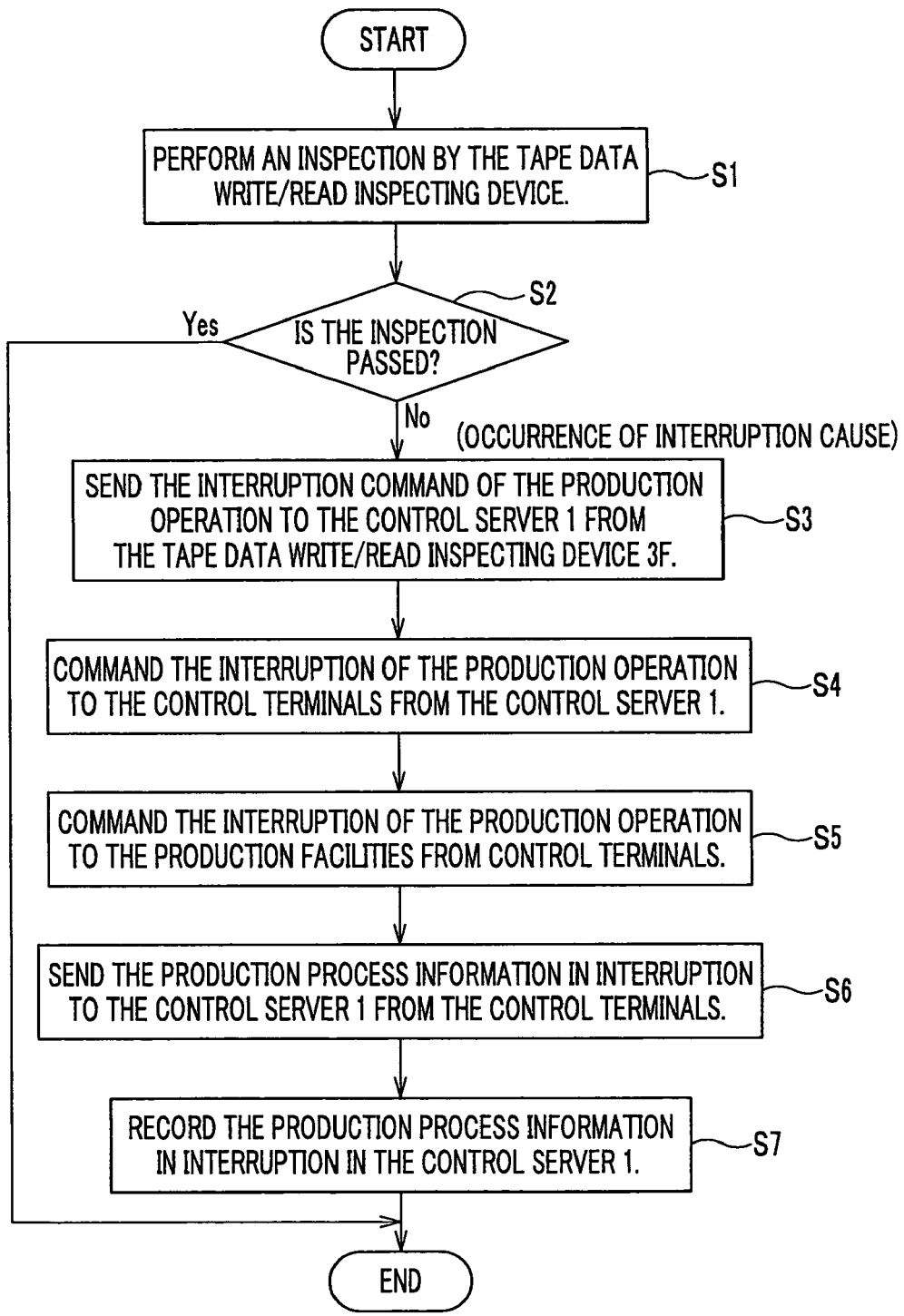
FIG. 6 is a flowchart showing an interruption handling flow due to a defect occurrence.

Next, in the production process control system of the magnetic tape cartridge 4, when a defect is found in the inspection process, handling to interrupt production in order to adjust a facility where the defect occurred is described referring to a flowchart showing an interruption handling flow due to a defect occurrence in FIG. 6.

Firstly, inspect the magnetic tape cartridge 4 by the tape data write/read inspecting device 3f (see FIG. 3) in the inspection process (S1).

Then, judge whether or not the inspection is passed (S2), and if passed (S2; Yes), terminate production handling (END). On the other hand, if not passed (S2; No), send an interruption command of production operation of the production facilities 3a to 3e to the control server 1 from the control terminal 2F of the tape data write/read inspecting device 3f in the inspection process (S3).

The control server 1 received the interruption command sends the interruption command of the production operation to the control terminals 2A to 2F, thereby making each facility interrupt (S4).

The control terminals 2A to 2E receiving it sends the interruption command of the production operation to the production facilities 3a to 3e (S5).

Meanwhile, for an uncompleted work till the impress process which has entered the servo write process in interruption because of the interruption command, perform operation until the impress process is completed, and when the impress process is completed, remove the work from the production line and keep it. Meanwhile, in the case of production interruption due to not a defect but production of other lots, here, carrying a different kind of magnetic tape cartridges into the production line makes it possible to flexibly handle a change of a production plan.

Then, send the production process information in interruption to the control server 1 to each the control terminal 2A to 2F (S6).

Then, the control server 1 records the production process information in interruption in the production process information data base 1c by the information recording unit 1a in interruption (S7).

b. [Operation of "Production Restarting Handling of Interrupted Lot"]

Figure 7:
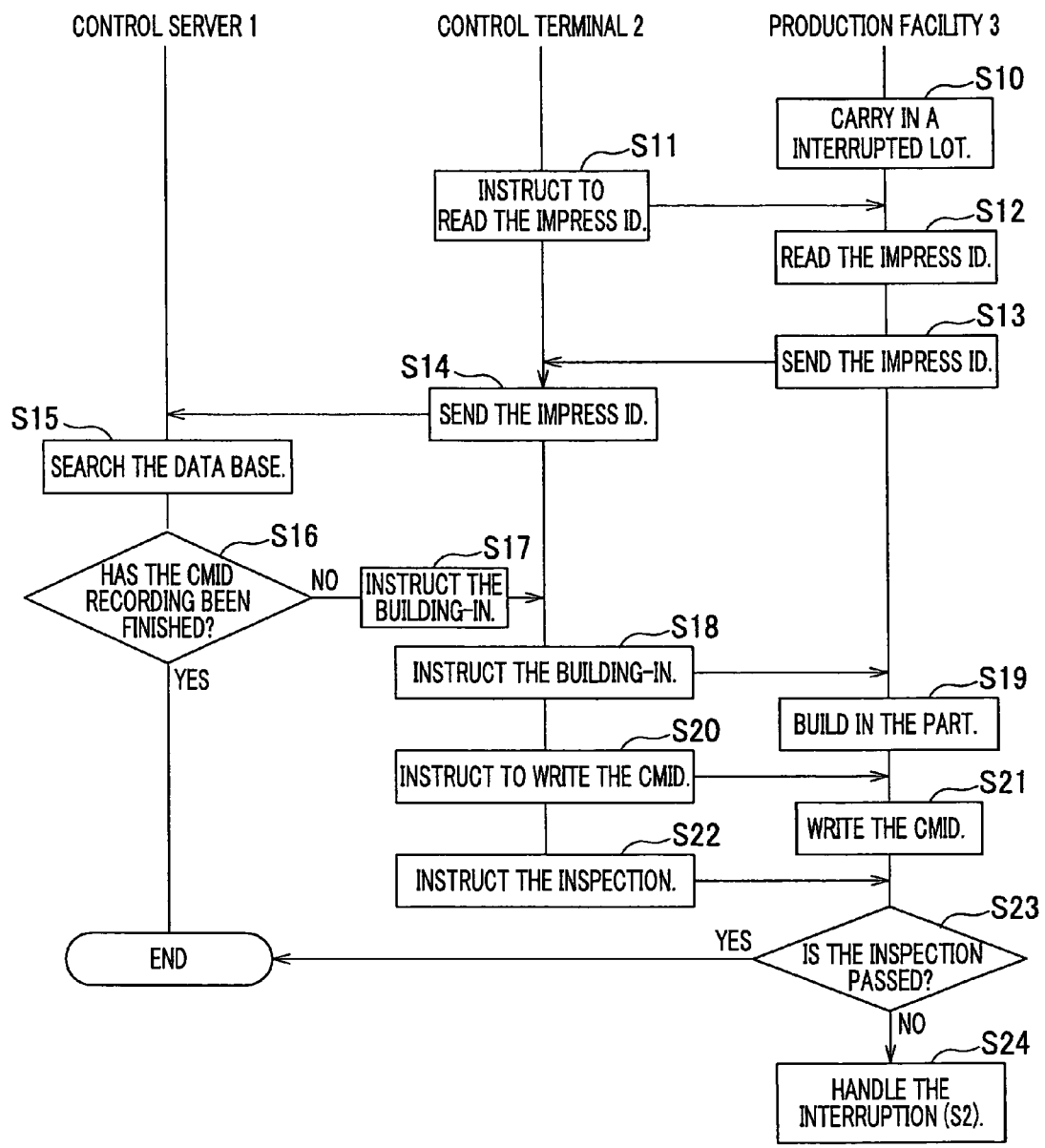
FIG. 7 is a flowchart showing a restart handling flow of an interrupted lot.

Subsequently, operation of production restarting handling of an interrupted lot in the case of a defect occurrence on the way of the production processes is described referring to a flowchart showing a production restarting handling flow of an interrupted lot in FIG. 7.

Firstly, carry all works of a production interrupted lot into the part building-in process of the production line (S10).

Next, send an instruction to the part building-in device 3c from the control server 1 so as to read the impress ID impressed on the lower half 7 of the magnetic tape cartridge 4 (S11).

Then, the part building-in device 3c reads the impress ID (S12) and sends it to the control terminal 2C (S13).

The control terminal 2C sends the received impress ID to the control server 1 (S14).

The control server 1 receiving it searches the impression ID in question out of the production process information data base 1c (S15) and judges whether or not the item of the CMID is recorded. When the CMID is recorded (S16; Yes), the work is finished till the inspection process and a complete product, so it passes throughout the line without the control terminals 2A to 2F of each process instructing the production operation. On the other hand, when the CMID is not recorded (S16; No), the control server 1 instructs building-in of a part to the control terminal 2C (S17). Here, in the column of item of the CMID in the table (see FIG. 4) of the production process information data base 1c, a case that S16 is Yes (magnetic tape cartridges 4 till the fifth record from top), the CMID being input, is finished till the inspection process and a complete product, so it passes throughout the line without the control terminals 2A to 2F of each process instructing the production operation: another case that S16 is No (magnetic tape cartridges 4 after the sixth record from top), the CMID being not input, results in the control server 1 instructing the building-in of the part to the control terminal 2C, The control terminal 2C instructs the part building-in device 3c to build in the part based on a building-in instruction received from the control server 1 (S18).

Then, the part building-in device 3c starts to build in components of the magnetic tape cartridge 4 (S19).

Then, when a work flows to the CM write process, the control terminal 2E instructs the CM data writing device 3e to write the production process information (S20) and the writing device 3e receiving it performs writing (S21). On the other hand, the control terminal 2E makes the writing device 3e read the CMID recorded in the cartridge memory 10 and sends it to the control server 1. The control server 1 writes the CMID received from the control terminal 2E in the production process information data base 1c.

In FIG. 4, writing of CMID (for example, a unique number such as "01317915") in the magnetic tape cartridges 4 of the fifth record from top and after is sequentially performed and the CMD is input in the table.

Subsequently, the control terminal 2F instructs an inspection to the tape data write/read inspecting device 3f (S22), and when the inspection is not passed (S23; No), again return to the process S2 (S24): when the inspection is passed (S23; Yes), complete the production. In FIG. 4, the magnetic tape cartridges 4 of the fifth record from top and after sequentially enter the inspection process, and for example, when the inspection is passed, "0" is input in the column of item of the inspection result in the table: when the inspection is not passed, "9" is input in the column.

Meanwhile, in production processes before an interruption, a work which did not enter the servo write process, that is, the work in a state of the pancake 5 is intended to be processed into the magnetic tape cartridge 4 from the servo write process in turn through each process.

In addition, when processes from the servo write process till the impress process due to such a change of a production plan after then become vacant, other lots can be produced. In the case, operation of the production process control system from the servo write process till the impress process is also similar to that described above.

The table of the production process information data base 1c in completion of production (in completion of the production operation) by write of the CMID being sequentially performed and the inspection process being passed is shown in FIG. 5. Al the CMID after the sixth record from top is written, and in all the column of the inspection result, "0" is input, whereby completion of the production is meant.

Although the operation is described in an example of the building-in instruction being sent to the control terminal 2C from the control server 1, it is also possible to make the control terminal 2C read (download) the impress ID in question searched (S15) out of production process information data base 1c of the control server 1.

The production process control system of magnetic tape cartridge 4 of the present embodiment enables the production operation to be restarted from an interrupted position of production operation of the production facilities 3a to 3f because in an occurrence of a production interruption cause such as a defect find of the magnetic tape cartridge 4 and a change of a production plan, the control server 1 can record the production process information in interruption in the production process information data base 1c by the information recording unit 1a in interruption; and in restarting production, the search unit 1b can search the production process information in interruption and send it to the control terminals 2A to 2F.

Therefore, in the case of occurrence of the interruption cause, it becomes unnecessary different from conventional systems to make a production line continue on operating till a last production process, thereby a problem of waste of raw materials due to a time loss and defect occurrence being able to be solved.

In addition, a change of a production plan due to a variation of demand, find of a defective lot, adjustment of a stock can be flexibly handled, and as a result, optimal production process control which is able to achieve cost-cutting and quality improvement can be realized.

Moreover, not only production control in a production control department but also an accuracy of improvement of various follow-ups in other departments such as a planning, designing, and logistic departments can also be achieved.

Still moreover, because the production control system can more timely handle customer needs by enforcing the production control (efficiency), products with higher performance and quality can be produced.

Thus, although one of embodiments of the present invention is described, the invention is not limited to such the embodiment.

For example, for the interruption cause, although the case that a defect of a lot is found on the way of production is made an example, the invention can also handle, not limited to the cause in question, the production interruption due to changes of a production plan, scheduling, process control, design, and the like.

What is claimed is:

1. A production process control system which includes a production process control server controlling production process information of a product and a control terminal controlling production operation of a production facility connected with said production process control server via a network, the system comprising:
   a production process information data base being a data base of the production process information of said product;
   an information recording means in interruption which when interrupting production operation on the way of a production process of said product, receives production process information in interruption from said control terminal and stores the production process information in said production process information data base; and
   a search means searching the production process information stored by said information recording means in interruption from said production process information data base in restarting interrupted production operation,
   wherein said control terminal comprises a production process restarting means controlling said production facility so as to perform the production operation based on said production process information in interruption searched by said search means in restarting the interrupted production operation when a production process taken charge by the control terminal is not completed.

2. A production process control system according to claim 1, wherein when a defect occurs on the way of production, production operation is interrupted.

3. A production process control system according to claim 1, wherein when a change of a production plan of said product occurs on the way of production, production operation is interrupted.

4. A production process control system according to claim 1, wherein when a change of a production scheduling of said product occurs on the way of production, production operation is interrupted.

5. A production process control system according to claim 1, wherein when a change of production control of said product occurs on the way of production, production operation is interrupted.

6. A production process control system according to claim 1, wherein when a change of production control of said product occurs on the way of production, production operation is interrupted.

7. A production process control method which controls a production process by a production process control server controlling production process information of a product and a control terminal controlling production operation of a production facility connected with said production process control server via a network, the method comprising the steps of:
   an information recording step in interruption in which when interrupting production operation on the way of the production process of the product, said production process control server receives production process information in interruption from said control terminal and stores the production process information in a production process information data base;
   a search step in which when restarting interrupted production operation, said production process control server searches said production process information stored by said information recording step in interruption from said production process information data base; and
   a production process restarting step in which when restarting the interrupted production operation, a control terminal controls the production facility so as to perform the production operation based on said production process information in interruption stored by said search step in the case that a production process taken charge by the control terminal is not completed.

8. A production process control method according to claim 7, wherein when interrupting production operation on the way of a production process of a magnetic tape cartridge, for a work having entered a servo write process in interruption, operation is performed till an impress process, and in completion of the impress process, the work is removed from a line and kept; and for a work finished till the servo write process, after a finish of a process in interruption the work is removed from said line and kept.

9. A production process control method according to claim 8, wherein when a defect occurs on the way of production, production operation is interrupted.

10. A production process control method according to claim 8, wherein when a change of a production plan of said product occurs on the way of production, production operation is interrupted.

11. A production process control method according to claim 8, wherein when a change of a production scheduling of said product occurs on the way of production, production operation is interrupted.

12. A production process control system according to claim 1, wherein when a defect occurs on the way of production, production operation is interrupted.

13. A production process control method according to claim 7, wherein when a defect occurs on the way of production, production operation is interrupted.

14. A production process control method according to claim 7, wherein when a change of a production plan of said product occurs on the way of production, production operation is interrupted.

15. A production process control method according to claim 1, wherein when a change of a production scheduling of said product occurs on the way of production, production operation is interrupted.

16. A production process control method according to claim 1, wherein when a change of production control of said product occurs on the way of production, production operation is interrupted.

17. A production process control method according to claim 7, wherein when a change of design of said product occurs on the way of production, production operation is interrupted.

18. A production process control method according to claim 7, wherein when a change of design of said product occurs on the way of production, production operation is interrupted.

* * * * *